(12) United States Patent
Willett

(10) Patent No.: US 8,263,907 B2
(45) Date of Patent: Sep. 11, 2012

(54) METHOD OF BAKING AND AN OVEN

(75) Inventor: Paul Eaton Willett, Whiteside (AU)

(73) Assignee: Moffat Pty Limited, Mulgrave (AU)

( * ) Notice: Subject to any disclaimer, the term of this patent is extended or adjusted under 35 U.S.C. 154(b) by 477 days.

(21) Appl. No.: 12/607,338

(22) Filed: Oct. 28, 2009

(65) Prior Publication Data

US 2010/0140250 A1    Jun. 10, 2010

(30) Foreign Application Priority Data

Oct. 31, 2008 (AU) .............................. 2008905624

(51) Int. Cl.
  *F27D 11/00* (2006.01)
  *H05B 6/80* (2006.01)
  *H05B 6/64* (2006.01)

(52) U.S. Cl. ........ 219/392; 219/394; 219/395; 219/397; 219/398; 219/762

(58) Field of Classification Search .............. 219/392, 219/394–395, 397–398, 685, 762
See application file for complete search history.

(56) References Cited

U.S. PATENT DOCUMENTS

| | | | | |
|---|---|---|---|---|
| 5,451,746 A * | 9/1995 | Kadwell et al. | ............... | 219/506 |
| 6,060,701 A * | 5/2000 | McKee et al. | ............... | 219/681 |
| 6,809,301 B1 * | 10/2004 | McIntyre et al. | ............. | 219/506 |
| 6,953,922 B2 * | 10/2005 | Lee | ................................ | 219/710 |
| 2007/0246451 A1 * | 10/2007 | Willett | .......................... | 219/394 |
| 2008/0257878 A1 * | 10/2008 | Willett | .......................... | 219/401 |

FOREIGN PATENT DOCUMENTS

WO    WO 2005013697 A1 *   2/2005

* cited by examiner

*Primary Examiner* — Mohsen Ahmadi
(74) *Attorney, Agent, or Firm* — Christensen O'Connor Johnson Kindness PLLC

(57) ABSTRACT

A baker's oven 10 and a method of operating the baking oven 10. The baking oven 10 including heating means 50 arranged to underlie baking trays 31 to provide a substantial proportion of the heat to the baking trays 31 than to other portions of the oven, a temperature sensor 62 for providing a signal indicative of oven temperature. An interface 60 is adapted to receive information from a baker indicative of a bake program and information corresponding to products being loaded into the oven. The control means 61 is operatively connected to the heating means 50, the temperature sensor 62 and the interface 60 to receive signals corresponding to oven variables comprising the oven temperature and a fixed baking time indicative of the product. The control means 61 is adapted to deactivate the heating means 50 after a first predetermined portion of the fixed baking time has elapsed in response to the oven temperature reaching a trip temperature.

14 Claims, 3 Drawing Sheets

METHOD OF BAKING AND AN OVEN

FIELD OF THE INVENTION

The invention relates to a baker's oven and in particular to the operation of the oven.

BACKGROUND OF THE INVENTION

A conventional baker's oven comprises a number of stacked oven compartments with individual oven doors at the front. Each level of the oven includes two side by side compartments, which each have a fixed shelf onto which baking trays or bread pans or a like can be loaded.

The oven compartments are heated by electric heating elements mounted bottom and top of each compartment. The heating elements are formed as single heating units comprising a number of parallel arms connected in series by U-shaped elements. The parallel arms extend from the oven door to the rear of the compartment and are spaced across the width of the oven.

The top and bottom heating elements can be separately controlled to vary the heat distribution within the oven. For certain types of baked goods, it is advantageous to supply the heat predominantly from the bottom of the oven. The bottom heating elements of conventional baker's ovens are usually more or less uniformly distributed over the floor of the oven to provide a uniform distribution of heat within the oven. According to conventional baking practice, it is important that a constant temperature is maintained throughout the baking cycle, thus preheating the oven, or allowing the oven to cool prior to loading with product is important. Typically the oven temperature must be kept within 10° C. of an ideal temperature.

It is known to use a timer to activate the oven prior to the arrival of the baker at the start of the day, so that the oven is preheated when the baker arrives. While the use of a timer effectively presents an oven at a predetermined temperature at a time set many hours earlier, there are risks (e.g., of fire) associated with activating unattended ovens. Commercially available Multi-deck, Setter ovens, and other such ovens with multiple baking chambers within one chassis, may be capable of baking many different products at the same time. However, it is commercially accepted that these ovens need to be preheated to, or above, recipe temperature before loading each product. As there is no fan assistance in most conventional ovens, the heat is typically difficult to control, and the baker must often be familiar with each oven's characteristics to achieve acceptable results.

Different bakery products require different baking temperatures. Therefore the baker's production schedule is complicated, and the oven utilization is reduced by having to pre-heat/pre-cool an oven prior to baking. The production schedule must be changed so that the oven temperature closely matches the requirements of the next product to be loaded. In busy bakeries, there is often the need to break the usual production cycle (due to rejected product, unexpected orders etc.) and there is also the issue of inexperienced staff needing to run ovens at short notice. Even for the most experienced operator, the issues involved in obtaining the most efficient production schedule are often at odds with what the store's customer's demand for fresh full variety of product.

A particular problem with controlling oven temperature is "heat over-run". Heat over-run stems from the thermal inertia of the heating system. Typically the heating elements are much hotter than the air in the oven. Heat is thereby transferred from the elements to the air and is in turn transferred to the bakery product in the oven. Heat over-run occurs after the oven is unloaded and the bakery product is removed. After the bakery products are removed, even if the heating elements are deactivated, heat stored within the elements is transferred to the air within the empty oven. This results in a very hot oven. This heat is not only wasted but results in considerable inefficiency in that the oven may well be too hot for the next batch of products to be loaded, meaning that the oven must then be precooled for the next batch. One approach to the issue is to gradually reduce the power to the heating elements as the oven air temperature approaches a required baking temperature. This means that the elements are not as hot as they might be when the oven is unloaded.

Objects of the present invention include to reduce oven preheating/precooling requirements or at least provide alternatives to existing arrangements in the marketplace.

SUMMARY OF THE INVENTION

According to the invention, there is provided a baker's oven including:
  supporting means for supporting one or more baking trays;
  heating means arranged to underlie the baking trays to provide a substantial proportion of the heat to the baking trays than to other portions of the oven;
  a temperature sensor for providing a signal indicative of oven temperature;
  an interface adapted to receive information from a baker indicative of a bake program and information indicative of products being loaded into the oven;
  control means operatively connected to the heating means, the temperature sensor and the interface; and
  the control means being adapted to deactivate the heating means after a first predetermined portion of a fixed baking time in response to the oven temperature reaching a trip temperature.

"Baking time" as used herein refers to the baking time experienced by the product. Typically the baking time commences with product being loaded into the oven and finishes with the issuance of a signal from an indicator means indicative of the end of the cycle (in response to which a baker should remove the product from the oven). The product could be retarded or proofed in a cold oven for a period of time (e.g., overnight). The baking time would then commence with the activation of the heating means.

The information indicative of a bake program might simply be the required baking time and a desired temperature (e.g., the trip temperature). Alternatively, the information might simply be an indicator of product type, the control means being configured to calculate the trip temperature and baking time based on the product type.

The control means may be adapted to deactivate the heating means after a second predetermined portion of the baking time independently of the oven temperature.

Preferably the control means is configured to thermostatically control the heating means. For example, the heating means may be thermostatically controlled to maintain the trip point temperature.

The first predetermined portion is preferably between 80% and 90%, and most preferably about 85%, of the baking time. The second predetermined portion is preferably about 95% of the baking time.

The trip temperature may be preselected to be about 10 degrees below a high set temperature, the high set temperature being the highest maximum temperature the oven should reach at any time. This temperature is determined by trial and error with the highset temperature being the highest baking temperature of the oven to yield acceptable product.

According to another aspect of the invention there is provided a method of operating the baking oven including a heating means arranged to underlie baking trays whereby a substantial proportion of the heat is provided to the baking trays, the method including the steps of heating the heating means according to a bake program indicative of products loaded into the oven, and deactivating the heating means after a first predetermined portion of a fixed baking time in response to the oven reaching a trip temperature.

The heating means and the supporting means are preferably relatively moveable to reduce the incidence of localized burning of product on the baking trays proximal the heating means.

The supporting means may include a carousel rotatable about a vertical axis. The interior of the oven is preferably substantially free of high thermal inertia objects, such as bulk ceramic material and plate metal fittings, to minimize thermal inertia of the oven interior and thereby improve baking conditions. This ensures that a large proportion and preferably substantially all of the heat supplied by the heating elements arranged according to the invention is supplied directly to productively produce product rather than heating objects, which store and radiate heat.

DESCRIPTION OF THE PREFERRED EMBODIMENTS

It has been discovered that by concentrating the active portions of the heating elements more directly under the baking trays the quality of baked goods and the operation of the baking oven can be improved. This has been found to be associated with supplying the heat more directly to the product.

According to an aspect of the invention not expressly claimed herein, there is provided a baking oven having heating elements arranged to underlie baking trays to provide a substantial proportion and preferably substantially all of the heat to an active region under the baking trays than to an inactive region positioned outwardly of the active region.

The oven chamber preferably includes heating elements extending from a wall of the oven into the active region, each element having an inactive portion and an active portion, the inactive portion extending from the wall to the active portion, which extends within the active region for more directly heating the underside of the baking trays.

In an advantageous arrangement, the oven includes a rotatable turntable for supporting the baking trays. In this instance the active region may be defined by an outer most periphery of the baking tray as it is rotated on the turntable. Alternatively, the active portions of the elements may lie within a region defined by an inner most portion of the outer periphery of the baking trays as they are rotated on the turntable. Preferably the baking trays define a rectangle centered on an axis of rotation of the carousel and the active region boundary is defined as being located between, and most preferably half way between, a circle defined by rotation of an outer most corner of the rectangle and a circle defined by rotation of the nearest approach of an edge of the rectangle about the axis.

Preferably the heating elements are arranged to provide more than 2 times, preferably 2.5 to 3.5, and most preferably 2.9 to 3.1, times greater power density to the active region than to the inactive region.

Preferably the heating elements are relatively narrow thereby allowing the heating elements to be more densely concentrated within the active region. Each heating element may include two elongate heating element portions, a steam generation chamber positioned intermediate and operably connected to the elongate heating element portions and having at least one steam outlet.

Figure 1:
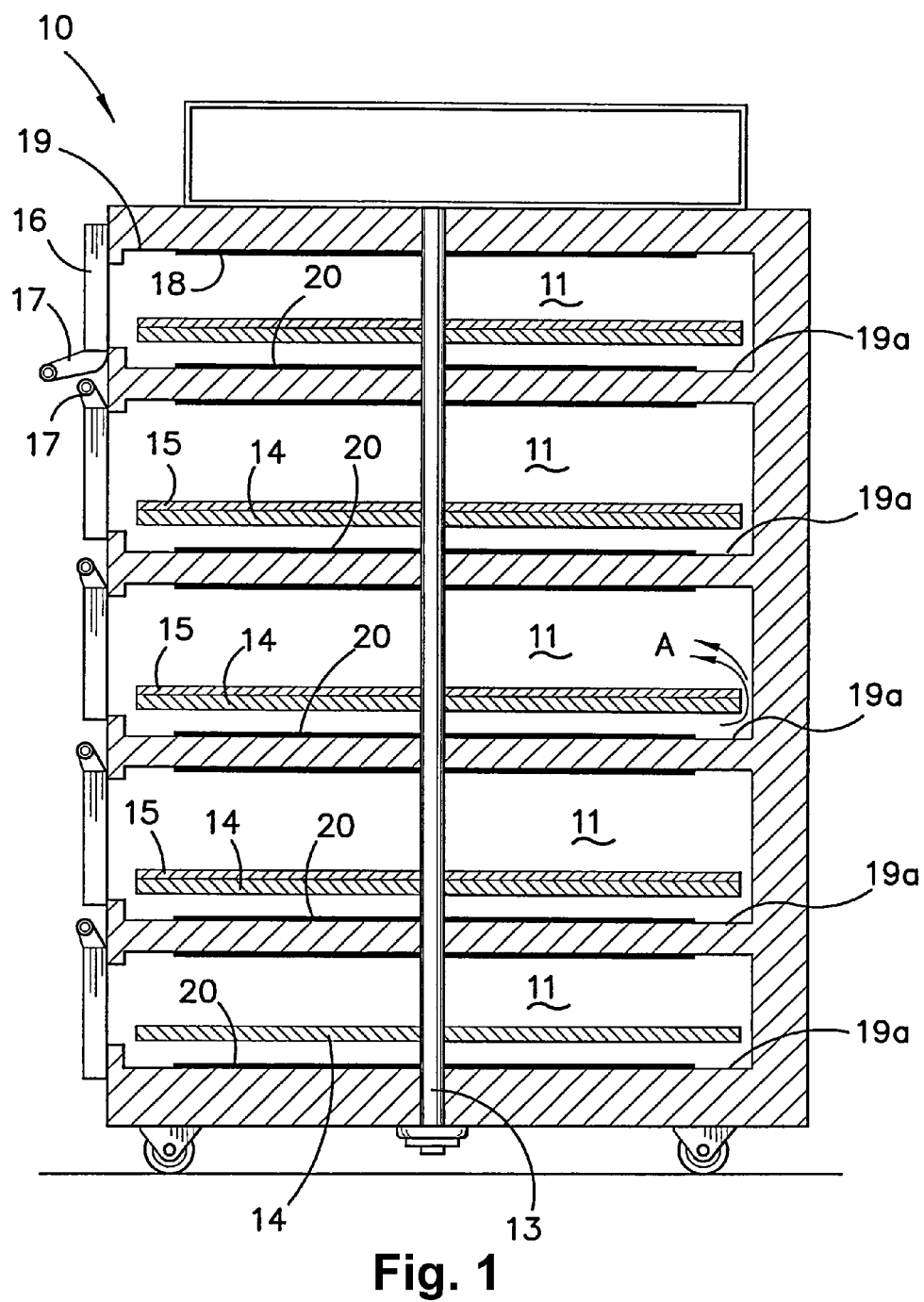
FIG. 1 is a sectional side view of a five level rotary baker's oven in accordance with an embodiment of the present invention.
Figure 2:
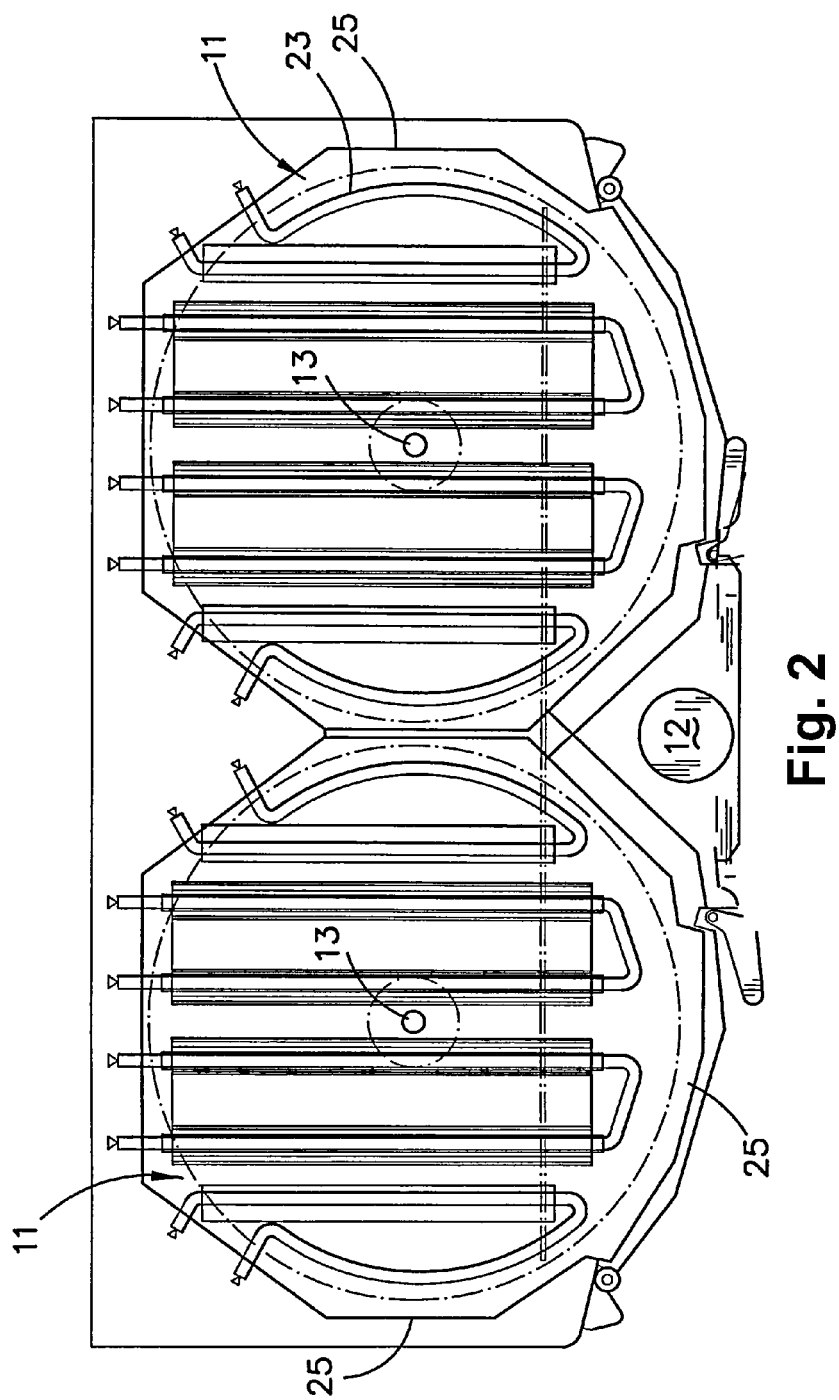
FIG. 2 is a sectional plan view showing one level of a previously disclosed oven.

Referring to FIGS. 1 and 2, the baker's oven is a rotary oven 10 similar to the type sold under the registered trade mark "ROTEL". In the embodiment illustrated, the oven has five levels with two oven compartments 11 on each level. A drive motor 12 (not shown) is operably connected to a pair of vertical shafts 13 on which are mounted turntables 14, which may incorporate optional ceramic "tiles" 15 on which the baking trays (not shown) are cooked. Each oven compartment 11 has an oven door 16 operably openable and closable by a handle 17.

Each oven compartment 11 has top heating elements 18 mounted to the underside of the top wall 19 of the oven compartment 11. As shown in more detail in FIG. 3, each oven compartment 11 has a pair of substantially U-shaped inner heating elements 20 mounted on the bottom wall 19a. The operation of the heating elements 20 is controlled by a computerized control system (not shown).

By selectively energizing the upper heating element 18 and the lower heating element 20 it is possible to control:
1. The air temperature within the oven chamber,
2. The heat rising directly from the lower heating element 20 to the bottom of the turntable 14 and thus the baking trays 30, and
3. The heat radiating from the upper heating elements 18.

For example by supplying more electrical power to the lower element 20, it is possible to supply more heat to the bottom of the turntable 14 and thus baking trays 30. This could be used to produce, for example, a bread having more bottom crust and a darker baked color on top.

It has been found that the position of the heating elements has a large bearing on the quality of the baked product. This is thought to be related to the control over the application of heat to the lower surfaces of turntable 14 and baking trays 30. By concentrating the heating elements under the baking trays, it is possible to provide a more concentrated heat to the underside of the turntable 14 and baking trays 30 and thereby have greater control over the above listed variables. The result is a baking oven, which can be used to produce an improved baked product.

Figure 3:
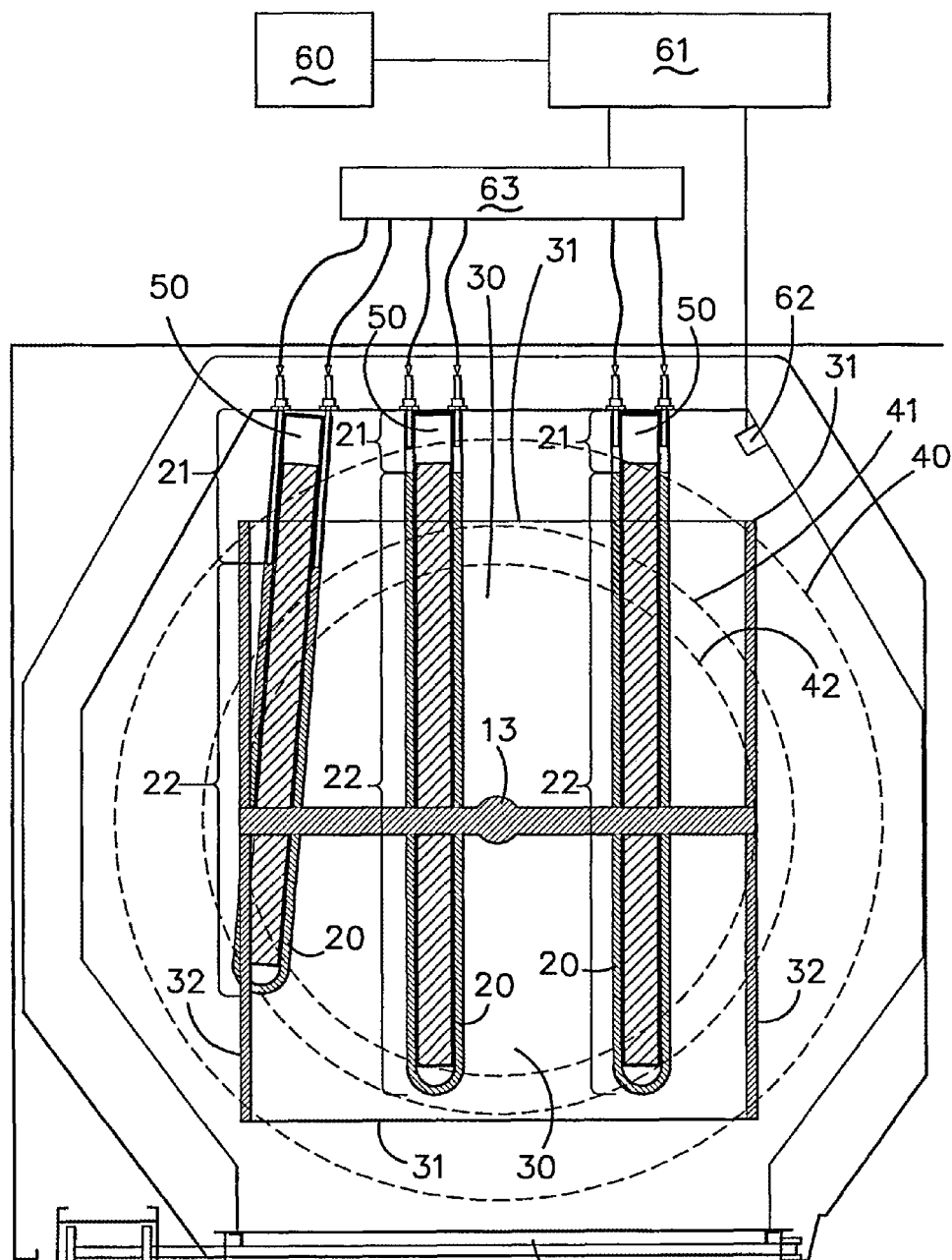
FIG. 3 is a sectional plan view of one side of one of the levels of the oven of FIG. 1 showing the heating elements and the baking trays.

FIG. 3 shows a cross sectional plan view of one side of the oven of FIG. 1. It shows a potential layout of the heating elements 20 and the relative positioning of the baking trays 30 when in use. The turntable 14 is omitted from this view for clarity. As illustrated the heating elements 20 are relatively narrow elongate members. This allows the heating elements 20 to be more closely spaced and positioned under the baking trays 30. Only three elements 20 are illustrated here for clarity although of course it is possible to use more. This concentration of heating elements differs from conventional thinking, which would have a number of widely spaced heating element portions evenly distributed across the oven floor to produce a more even distribution of heat throughout the baking chambers.

As illustrated in FIG. 2, previously disclosed ovens have widely spaced heating elements evenly spread across the baking chamber 11 including providing heating element portions 23 close to peripheral wall 25.

To give an idea of scale, each baking tray 30 is about 18 inches (460 mm) by about 30 inches (720 mm) and the trays are spaced by the shaft 30, which is about 1 inch (25 mm) thick. Thus the two trays being spaced by the shaft 13 define a rectangle of about 37 inches (940 mm) by about 30 inches (720 mm). This tray size is commonly used in Victoria (a region of Australia). Elsewhere in Australia 405 mm×737 mm is a common tray size. Trays as large as 460 mm×762 mm are sometimes used.

Each heating element 20 is provided with an inactive portion 21 and an active portion 22. The inactive portion 21 does not produce heat. The active portion 22 produces heat. The heating element extends from a wall 120 of the oven with the inactive portion 21 of the heating element providing an inactive region of the oven. The active portion 22 of the heating element extends from the inactive portion 21 into the active region of the oven beneath the baking trays 30. The active portions have a more or less homogenous construction, but have been found to produce little or no heat along a length of 25 mm or so adjacent the inactive portions 21.

It has been found that an improved distribution of heat within the baking chamber can be achieved by positioning the active portions 22 within the region 40 described by the outer most corner 31 of the baking trays as it is rotated about the shaft 13. This region is herein referred to as the active region. The shorter heating element 20 is arranged so that the active portion 22 lies predominantly within a smaller active region 41. The smaller active region 41 is defined by the nearest approach of the farther surfaces 31 of tray 30 to the shaft 13 as it is pivoted about shaft 13. Innermost active region 42 is defined by the innermost approach of edge 32 of trays 30 as it rotates around shaft 13. The positioning of the active portions 22 within this innermost active region 42 means that the active regions are always directly underneath the baking tray as it is rotated about shaft 13.

The ideal location of the boundary 140 between the active region and the inactive region is calculated with respect to the nearest and furthest approaches (relative to the central axis 13) of the edge 31, which correspond to the circles 40, 41, such that boundary 140 is halfway between circles 40, 41. Power densities of 0.133 W/cm² and 0.4 W/cm² in the inactive and active regions respectively have been found to be ideal.

TABLE 1

| Process | Scenario 1 High oven air temp bake | Scenario 2 Low oven air temp bake |
| --- | --- | --- |
| Oven temp before load (0 min) | 230 | 200 |
| Oven temp after load (0 min) | 210 | 170 |
| Oven temp after (10 min) | 220 (at trip point) | 190 |
| Oven temp after (20 min) | 220 (at trip point) | 205 |
| Oven temp at 85% of bake time (25.5 min) | 220 (all heating off) | 210 |
| Oven temp at 90% of bake time (27 min) | 218 | 212 |
| Oven temp at 95% of bake time (28.5 min) | 216 | 216 (all heating off) |
| Oven temp at unload (30 min) | 214 | 214 |
| Oven temp after unloading (30 min) | 228 | 228 |

Table 1 illustrates the operation of the oven according to a preferred form of the invention. In this example the bakery product is sandwich bread for which a baking time of 30 min and high set temp of 230° C. have been determined through trial and error on this type of oven to be sufficient to produce acceptable product. Two possible scenarios are shown. In scenario 1 the oven is initially relatively hot. Scenario 2 shows an initially cooler oven.

In both scenarios a trip point temperature of 220° C., i.e., 10° C. less than the high set temp, is determined. About 30° C. of heat is lost from the oven upon loading. The oven is then thermostatically controlled to maintain, or at least attempt to maintain the trip point temperature.

In scenario 1, starting out with a relatively hot oven, the oven cools and reaches trip point temperature 220° C. after 10 min. Thereafter the heating elements are thermostatically controlled to cycle on and off to maintain this temperature. Having reached trip point temperature, the elements are deactivated at 85% of the baking time, i.e., 25.5 minutes. Having cycled on and off between 10 and 25.5 minutes, the heating elements in this scenario are active for a total 23 minutes out of the 30 minute baking time.

In scenario 2, starting with a cooler oven, the heating elements operate continuously but the oven does not reach trip point temperature. The heating elements are deactivated at 95% of the baking time, i.e., 28.5 minutes.

In both scenarios the bread continues to bake after deactivation of the elements. Residual heat within the oven, including heat stored in the elements is thus absorbed. As a result, upon unloading, the elements are much cooler than they might otherwise be, and heat over-run is substantially reduced. In both scenarios, the heat over-run is only 14° C. (i.e., 214° C. to 228° C.) so that a like batch of bread can be immediately loaded.

Both scenarios produce satisfactory bread, indeed the product is essentially indistinguishable.

The method of operating and controlling the heating elements is preferably implemented using electronics and software incorporated into the oven.

The preferred operation of the oven is as follows:

The baker selects the product to be baked, from a menu that is presented as a product name, product category, or as a simple product code or number. These can be presented on the control panel screen as pictures, drawings, or just descriptive names or numbers. In response to the product selection, the controller 61 determines the trip temperature and baking time.

Once selected, program lock-outs that will stop the program operating are "MINIMUM LOAD TEMPERATURE" and "MAXIMUM LOAD TEMPERATURE" that may be specific to each product, or sometimes product type. A thermocouple 62 inside the oven chamber is read at regular intervals by the software, and so, for example, an oven chamber that is read as at 120 degrees C. will reject any program for products with a "MINIMUM LOAD TEMPERATURE" above 120 degrees. There may be many products that can bake and produce acceptable product from as low as 20 degrees C., ranging up to 119 degrees C., and any of these can be loaded without lock-out occurring.

Once the program product has been accepted the interface 60 will flash a message "LOAD PRODUCT". Once loaded, the baker presses the "BAKE START" button, and the elements are thermostatically operated by power source 63 to maintain the trip temperature.

As heat is supplied directly to the product from elements on the oven floor and oven roof, it is possible to provide more or less top heat or bottom heat to the product, so as to ensure that, for example, product with a thicker bottom material than top material will have the thicker material bake at the same time by simply increasing bottom element power and reducing top element power.

The concentration of heating elements in the active region is thought to allow a more directed application of heat to the baking trays, thereby reducing product burning as a result of excessive oven temperature. The relative motion of the carousel has been found to reduce burning of products overlying the elements.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A baker's oven including:
    an oven chamber;
    support means for supporting one or more baking trays, including a rotatable turntable, the position of the baking tray defining a rectangle centered on an axis of rotation of the rotatable turntable and the rotatable turntable having an active region boundary that is defined as being between a circle defined by rotation of an outer most corner of the rectangle and a circle defined by rotation of the nearest approach of an edge of the rectangle to the axis;
    heating means arranged to underlie the baking trays to provide a substantial proportion of the heat to the baking trays than to other portions of the oven, the heating means including a plurality of heating elements extending from a wall of the oven into the active region, each element having an inactive portion and an active portion, the inactive portion extending from the wall to the active portion which extends in the active region for more directly heating an underside of the baking trays;
    a temperature sensor for providing a signal indicative of oven temperature;
    an interface adapted to receive information from a baker indicative of a bake program and information corresponding to products being loaded into the oven; and
    control means operatively connected to the heating means, the temperature sensor and the interface to receive signals corresponding to oven variables comprising the oven temperature and a fixed baking time indicative of the product; the control means being adapted to deactivate the heating means after a first predetermined portion of the fixed baking time has elapsed in response to the oven temperature reaching a trip temperature.

2. The baking oven of claim 1 wherein the required baking time and the trip temperature is input by the baker to the interface.

3. The baking oven of claim 1 wherein the control means is configured to calculate the trip temperature and baking time based on the product type.

4. The baking oven of claim 1 wherein the control means is adapted to deactivate the heating means after a second predetermined portion of the baking time independently of the oven temperature.

5. The baking oven of claim 4 wherein the second predetermined portion is about 95% of the baking time.

6. The baking oven of claim 1 wherein the control means is configured to thermostatically control the heating means.

7. The baking oven of claim 1 wherein the first predetermined portion is between 80% and 90% of the baking time.

8. The baking oven of claim 7 wherein the first predetermined portion is about 85%, of the baking time.

9. The baking oven of claim 1 wherein the trip temperature is preselected to be about 10 degrees below a high set temperature, the high set temperature being the highest maximum temperature the oven should reach at any time.

10. The baking oven of claim 1 wherein the oven chamber has an active region under the baking tray position and an inactive region positioned outwardly of the active region, the heating means including heating elements being positioned to provide substantially more heat to the active region than to the inactive region for more directly heating an underside of the baking tray position.

11. The baking oven of claim 1 wherein the heating elements are arranged to provide more than 2 times greater power density to the active region than to the inactive region.

12. The baking oven of claim 1 wherein the heating elements are arranged to provide 2.5 to 3.5 times greater power density to the active region than to the inactive region.

13. The baking oven of claim 1 wherein the heating elements are arranged to provide 2.9 to 3.1 times greater power density to the active region than to the inactive region.

14. A method of operating the baking oven including a heating means arranged to underlie baking trays on a support means, the heating means including a plurality of heating elements extending from a wall of the oven into the active region, each element having an inactive portion and an active portion, the inactive portion extending from the wall to the active portion, which extends in the active region for more directly heating an underside of the baking trays, the support means including a rotatable turntable, the position of the baking tray defining a rectangle centered on an axis of rotation of the rotatable turntable, the rotatable turntable having an active region boundary that is defined as being between a circle defined by rotation of an outer most corner of the rectangle and a circle defined by rotation of the nearest approach of an edge of the rectangle to the axis, whereby a substantial proportion of the heat is provided to the baking trays, the method including the steps of:
    heating the heating means according to a bake program indicative of products loaded into the oven wherein the heating means and the supporting means are relatively moveable to reduce the incidence of localized burning of product on the baking trays proximal the heating means, and
    deactivating the heating means after a first predetermined portion of a fixed baking time in response to the oven reaching a trip temperature.

* * * * *